United States Patent
Zhuge et al.

(10) Patent No.: US 12,299,895 B2
(45) Date of Patent: May 13, 2025

(54) IMAGE MATTING METHOD AND APPARATUS INVOLVE PERFORMING FEATURE POINTS DETECTION ON IMAGE, FIRST IMAGE AREA MANUALLY MARKED ON IMAGE, AND FIRST IMAGE AREA IS ADJUSTED ACCORDING TO FEATURE POINTS

(71) Applicant: BEIJING BYTEDANCE NETWORK TECHNOLOGY CO., LTD., Beijing (CN)

(72) Inventors: Jingjing Zhuge, Beijing (CN); Guangyao Ni, Beijing (CN); Hui Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 423 days.

(21) Appl. No.: 17/770,983

(22) PCT Filed: Jul. 29, 2020

(86) PCT No.: PCT/CN2020/105441
§ 371 (c)(1),
(2) Date: Apr. 21, 2022

(87) PCT Pub. No.: WO2021/077836
PCT Pub. Date: Apr. 29, 2021

(65) Prior Publication Data
US 2022/0375098 A1 Nov. 24, 2022

(30) Foreign Application Priority Data
Oct. 24, 2019 (CN) .......................... 201911014880.7

(51) Int. Cl.
*G06T 7/13* (2017.01)
*G06T 5/70* (2024.01)
(Continued)

(52) U.S. Cl.
CPC .................. *G06T 7/13* (2017.01); *G06T 5/70* (2024.01); *G06T 7/11* (2017.01); *G06T 7/12* (2017.01);
(Continued)

(58) Field of Classification Search
None
See application file for complete search history.

(56) References Cited

U.S. PATENT DOCUMENTS 6,654,497 B1 * 11/2003 Kondo .................... G06T 7/181
382/199
2015/0193939 A1 7/2015 Gurman
(Continued)

FOREIGN PATENT DOCUMENTS

CN 104657974 A 5/2015
CN 104820990 A 8/2015
(Continued)

OTHER PUBLICATIONS

Machine Translation in English of CN109448007 to Lin et al.*
(Continued)

*Primary Examiner* — Haris Sabah
(74) *Attorney, Agent, or Firm* — BakerHostetler

(57) ABSTRACT

An image matting method and apparatus, an electronic device, and a computer-readable storage medium. The method comprises: performing feature point detection on an image so as to obtain a feature point; acquiring a first image region manually marked on the image; adjusting the first image region according to the feature point, so as to obtain a second image region; and performing matting on the image
(Continued)

according to the second image region. The manually marked first image region is adjusted according to the feature point, so as to acquire the second image region which is more accurately positioned, and then matting can be performed according to the second image region so as to accurately extract a required region.

20 Claims, 4 Drawing Sheets

(51) Int. Cl.
    *G06T 7/11*     (2017.01)
    *G06T 7/12*     (2017.01)
    *G06T 7/181*     (2017.01)
    *G06V 10/771*     (2022.01)
    *G06V 10/44*     (2022.01)

(52) U.S. Cl.
    CPC ............ *G06T 7/181* (2017.01); *G06V 10/771* (2022.01); *G06T 2207/20164* (2013.01); *G06T 2207/30201* (2013.01); *G06V 10/44* (2022.01); *G06V 2201/07* (2022.01)

(56) References Cited

U.S. PATENT DOCUMENTS

| | | | |
|---|---|---|---|
| 2019/0014884 A1* | 1/2019 | Fu | G06T 19/20 |
| 2019/0206043 A1* | 7/2019 | Wang | G06T 7/13 |
| 2019/0347778 A1* | 11/2019 | Barkley | G06V 10/50 |

FOREIGN PATENT DOCUMENTS

| | | | |
|---|---|---|---|
| CN | 109388725 A | | 2/2019 |
| CN | 109389611 A | | 2/2019 |
| CN | 109448007 | * | 3/2019 |
| CN | 109934843 A | | 6/2019 |
| CN | 110097560 A | | 8/2019 |
| WO | WO 2015/074476 A1 | | 5/2015 |

OTHER PUBLICATIONS

International Patent Application No. PCT/CN2020/105441; Int'l Search Report; dated Nov. 4, 2020; 2 pages.

Written Opinion for International Application No. PCT/CN2020/105441, mailed Nov. 4, 2020, 7 Pages.

* cited by examiner

IMAGE MATTING METHOD AND APPARATUS INVOLVE PERFORMING FEATURE POINTS DETECTION ON IMAGE, FIRST IMAGE AREA MANUALLY MARKED ON IMAGE, AND FIRST IMAGE AREA IS ADJUSTED ACCORDING TO FEATURE POINTS

CROSS REFERENCE OF RELATED APPLICATION

The present application is the national phase application of International Patent Application No. PCT/CN2020/105441, titled "IMAGE MATTING METHOD AND APPARATUS", filed on Jul. 29, 2020, which claims the priority to Chinese Patent Application No. 201911014880.7, titled "IMAGE MATTING METHOD AND APPARATUS", filed on Oct. 24, 2019, with the Chinese Patent Office, both of which are incorporated herein by reference in their entireties.

FIELD

The present disclosure relates to the technical field of information processing, and in particular to an image matting method, an image matting apparatus, and a computer readable storage medium.

BACKGROUND

Image matting, as one of the most common operations in image processing, refers to separating a certain part of a picture or video from an original picture or video, to obtain a separate layer for subsequent synthesis.

In the conventional technology, a matting template with a fixed shape and certain transparency is generally used for matting. Taking matting of eyes as an example, a matting template is designed based on a standard face in advance, where eye regions in the matting template are transparent, and remaining regions have a covering color (for example, black). When matting is performed, a face region is first detected from the image, and the matting template is superimposed on the face region in the image, to obtain the eye regions.

However, in practice, the image and the matting template are often not completely matched with each other. Take matting of eyes as an example, the matting template is generally designed based on a standard face, but the face in the image is often not exactly the same as the standard face. For example, when the face in the image is larger than the standard face, the image cut out by using the matting template may include only parts of the eyes, and the entire eye image cannot be cut out. As another example, when the face in the image is smaller compared to the standard face, the image region cut out by using the matting template is too large relative to the eyes, that is, the cutout image contains an image that is not the eye region. As another example, when the angle of the face in the image is different from the standard face, for example, the standard face is a front face and the face in the image is a side face, positions of the eyes in the face in the image is different from that of the standard face, such that the image cut out by using the matting template does not include the eyes at all. As can be seen, it is difficult to accurately cut out a required region from an image by using a matting template.

SUMMARY

The summary is provided to introduce in a simplified form a selection of concepts that are further described below in the embodiments. The summary is not intended to identify key or critical elements of the claimed technical solution, or to limit the scope of the claimed technical solution.

The technical problem solved by the present disclosure is to provide a matting method to at least partially solve the technical problem that it is difficult to accurately cut out a required region from an image by using a matting template in the conventional technology. In addition, a matting apparatus, a matting hardware apparatus, a computer-readable storage medium, and a matting terminal are further provided.

In order to achieve the above objective, according to one aspect of the present disclosure, the following technical solution is provided.

An image matting method is provided, which includes:
performing feature point detection on an image, to obtain feature points;
obtaining a first image region that is manually marked on the image;
adjusting the first image region according to the feature points, to obtain a second image region; and
performing matting on the image according to the second image region.

In order to achieve the above objective, according to one aspect of the present disclosure, the following technical solution is provided.

An image matting apparatus is provided, which includes:
a feature point detection module, configured to perform feature point detection on an image, to obtain a plurality of feature points;
a mark region obtaining module, configured to obtain a first image region that is manually marked on the image;
a region determination module configured to adjust the first image region according to the feature point, to obtain a second image region; and
a matting module, configured to perform matting on the image according to the second image region.

In order to achieve the above objective, according to one aspect of the present disclosure, the following technical solution is provided.

An electronic device is provided, which includes:
a memory, configured to store non-transient computer readable instructions; and
a processors configured to execute the computer readable instructions to perform the matting method according to any one of the above.

In order to achieve the above objective, according to one aspect of the present disclosure, the following technical solution is provided.

A computer readable storage medium configured to store non-transient computer readable instructions is provided. The non-transient computer readable instructions, when executed by a computer, cause the computer to perform the matting method according to any one of the above.

In order to achieve the above objective, according to one aspect of the present disclosure, the following technical solution is provided.

A matting terminal is provided. The matting terminal includes the matting apparatus according to any one of the above.

In the embodiments of the present disclosure, the part to be cut out in the image is manually marked in the first image region, and the first image region is adjusted according to the feature points, so that the part to be cut out in the image can be accurately located in the second image region, and matting is performed based on the second image region, so as to accurately cut out the required region. In this way, since the matting template is replaced by manual marking, even if the image does not match the matting template, the required image part can be accurately cut out.

The above description is only a summary of the technical solutions of the present disclosure. In order to more clearly understand the technical means of the present disclosure so as to implement the present disclosure in accordance with contents of this specification, preferred embodiments are described in detail below with reference to the accompanying drawings, such that the above-described and other objects, features and advantages of the present disclosure can be more apparent and more clearly understood.

BRIEF DESCRIPTION OF THE DRAWINGS

These and other features, advantages and aspects of the embodiments of the present disclosure will be more apparent in conjunction with following embodiments of the present disclosure with reference to accompanying drawings. Throughout the drawings, the same or similar reference signs indicate the same or similar elements. It should be understood that the drawings are schematic and the components and elements and are not necessarily drawn to scale.

DETAILED DESCRIPTION OF THE EMBODIMENTS

Figure 1A:
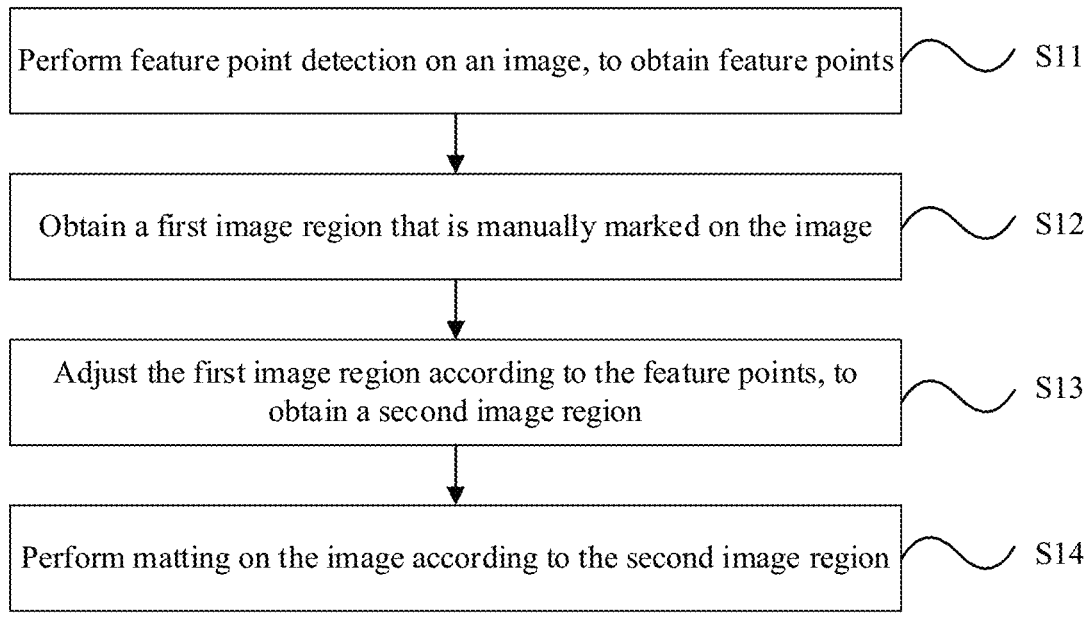
FIG. 1s is a flow chart of a matting method according to an embodiment of the present disclosure.
FIG. 1b is a schematic diagram of feature points of a face in a matting method according to an embodiment of the present disclosure.
FIG. 1c is a schematic diagram of manually marked points in a matting method according to an embodiment of the present disclosure.
FIG. 1d is a schematic diagram of extension points and a second image region in a matting method according to an embodiment of the present disclosure.
FIG. 1e is a schematic diagram of a vertex being a convex point in a matting method according to an embodiment of the present disclosure.
FIG. 1f is a schematic diagram of a vertex being a concave point in a matting method according to an embodiment of the present disclosure.
FIG. 1g is a schematic diagram of extension points in a case that the vertex is a convex point in a matting method according to an embodiment of the present disclosure.
FIG. 1h is a schematic diagram of an extension point in a case that the vertex is a concave point in a matting method according to an embodiment of the present disclosure.
FIG. 1i is a schematic diagram of a cutout image region in a matting method according to an embodiment of the present disclosure.

Hereinafter, embodiments of the present disclosure will be described in more detail with reference to the accompanying drawings. Although some of the embodiments of the present disclosure are shown in the drawings, it should be understood that the present disclosure can be implemented in various forms and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of the present disclosure.

It should be understood that the various steps recorded in the method embodiments of the present disclosure may be executed in a different order, and/or executed in parallel. In addition, method embodiments may include additional steps and/or the illustrated steps may be omitted. The scope of the present disclosure is not limited in this respect.

The term "including" and its variants as used herein are open-ended includes, that is, "including but not limited to". The term "based on" indicates "based at least in part on". The term "an embodiment" indicates "at least one embodiment", the term "another embodiment" indicates "at least one additional embodiment", the term "some embodiments" indicates "at least some embodiments". Related definitions of other terms will be given in the following description.

First Embodiment

In order to solve the technical problem in the prior art that it is difficult to accurately cut out a required region from an image by using a matting template, a matting method is provided according to an embodiment of the present disclosure. As shown in FIG. 1a, the matting method includes the following steps S11 to S14.

In step S11, feature point detection is performed on an image to obtain multiple feature points.

The image may be a human face image, an animal image, and the like.

Figure 1B:
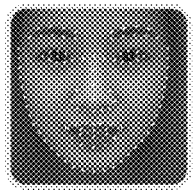

The feature point is a point where the gray value of the image changes drastically or a point on an edge of the image with a large curvature (that is, an intersection of two edges), which has distinctive characteristics, effectively reflects the essential features of the image, and identifies a target object in the image. For example, as shown in FIG. 1b, if the image is a face image, the feature point detection is performed on the face image to obtain the feature points on the face. The white points shown in FIG. 1b are the feature points on the face, including pixel points of and surrounding the eyes and pixel points of and surrounding the nose, and the like.

The feature points in the image may be obtained by using a feature point detection algorithm. In a case that the image is a face image, the feature points in the image may be detected by using a face template.

In step S12, a first image region that is manually marked on the image is obtained.

Specifically, a user may mark a customized image region according to his or her own needs. Specifically, the user determines the first image region by marking points or lines around the image region to be cut out. The first image region is a manually determined initial image region, and is generally a rough range including the cutout image region.

Figure 1C:
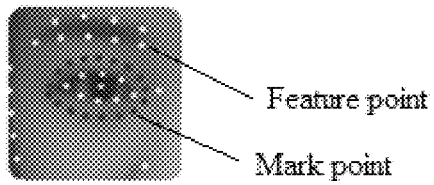

For example, if the user wants to cut out the eye region, the user may mark points or draw a circle around the eye region, that is, eyes, in the image, to determine a rough range of the eye region to be cut out. For example, in FIG. 1c, the black points are manually marked mark points, and the white points are feature points.

In step S13, the first image region is adjusted according to the feature points to obtain a second image region.

Since the first image region is manually marked, and does not accurately match the image region to be cut out. Therefore, the first image region needs to be adjusted according to the feature points. The feature points here are the feature points located inside, at the edge and adjacent to the first image region. Since the feature points characterize the image to the maximum extent, these feature points are used to adjust the first image region so that the determined second image region is closer to the image region to be cut out, that is, the cutout image region is more accurate.

In step S14, matting is performed on the image according to the second image region.

The second image region may be directly cut out as the cutout region, or the second image region may be further adjusted to re-determine an image region and then cut out the re-determined image region, which are described in the fourth optional embodiment.

In this embodiment, the first image region is manually marked, and is adjusted according to the feature points. Since the feature points characterize the image to the maximum extent, the feature points are used to adjust the first image region, so that the determined second image region is closer to the image region to be cut out, to obtain a more accurate cutout image region. In addition, since the feature points and the marked first image region are determined according to the image, for different images, the detected feature points and the marked first image region for the image match the part of the image to be cut out. Therefore, this embodiment enables target regions in different images to be accurately cut out, and is applicable to matting of various images.

In a first optional embodiment, step S12 includes following steps S121 to S122.

In step S121, a mark point that is manually marked on the image is obtained.

Specifically, a user may mark customized mark points according to his or her own needs. For example, if the user wants to cut out the eye region, the user may mark points around the eye region, that is, the eyes, in the image. For example, in FIG. 1c, the black points are manually marked mark points. The mark points that are manually marked are obtained from the image.

In step S122, the mark point is determined as an edge point of the first image region.

Specifically, an image region enclosed by the mark point is determined as the first image region, that is, the mark point is the edge point of the first image region.

In a second optional embodiment, step S13 includes following steps S131 to S132.

In step S131, a position of the mark point is adjusted according to the feature points, to determine a first target point corresponding to the mark point.

Since the mark point is manually marked, the image region determined by the mark points may not accurately match the image region to be cut out. Therefore, the mark point needs to be adjusted according to the feature points. Since the feature points characterize the image to the maximum extent, the feature points are used to adjust the mark point to obtain the first target point, such that the second image region determined by the first target point is closer to the image region to be cut out, that is, the cutout image region is more accurate.

In step S132, a closed region enclosed by the first target points is determined as the second image region.

In a third optional embodiment, step S131 includes following steps S1311 to S1313.

In step S1311, an initial point that is closest to the mark point is selected from the feature points.

Specifically, for multiple feature points, a distance between each of the feature points and the mark point is calculated. The distance may be, for example, a cosine distance, a Euclidean distance, and the like. The feature point with the smallest distance to the mark point is selected as the feature point closest to the mark point. In step S1312, a closed region enclosed by the initial point is determined as the third image region.

In a case that multiple initial points are selected, the closed region formed by the initial points is a polygon, and the closed region formed by the polygon is the third image region. For example, in a case that three initial points are selected, the closed region enclosed by the three initial points is a triangle, and the region enclosed by the triangle is the third image region.

In step S1313, a center position of the third image region is determined as the first target point corresponding to the mark point.

In a case that the third image region is a polygon, the center position of the polygon is determined as the first target point corresponding to the mark point. The center position may be a geometric center or a geometric gravity center of the polygon. For example, if the polygon is a regular polygon, such as a regular triangle, a regular quadrangle, or a regular pentagon, the corresponding center position is the geometric center or the intersection of the diagonals. If the polygon is an irregular polygon, the corresponding center position is the geometric gravity center, that is, the intersection of center lines of sides of the polygon.

In the above scenario, a method for determining the first target point where at least three initial points that are closet to the mark point are selected is shown. In addition, one feature point closest to the mark point may be selected from the feature points as the first target point. Alternatively, two feature points closest to the mark point are selected from the feature points, and a midpoint of a connecting line between the two feature points is used as the first target point.

In a fourth optional embodiment, step S14 includes following steps S141 to S143.

In step S141, an edge of the second image region is determined as an initial edge.

An edge of the image is an intersection between one image region having an attribute and another region having a different attribute, at which the region attribute changes abruptly. The existing image edge extraction method may be used to determine the edge of the second image region. For example, the image edge extraction method that may be used may include: the differential operator method, the Laplacian of Gaussian operator method, the Canny operator, the fitting method, the relaxation method, the neural network analysis method, the wavelet transform method, and the like.

In step S142, the second image is expended outwardly from the initial edge, to obtain a target edge.

The target edge is an edge of the expanded image region.

In step S143, a fourth image region enclosed by the target edge is cut out to obtain a cutout image.

Specifically, the fourth image region may be directly cut out as the target image, and pixel values of pixels in the cutout image are pixel values of the pixels in the image, that is, the pixel values remain unchanged. In addition, in order that the cutout image has a smooth edge region, edge transparency transition processing may be performed on the image region enclosed by the initial edge and the target edge, which is described in detail in the eighth optional embodiment below.

In a fifth optional embodiment, step S142 includes following steps S1421 to S1423.

In step S1421, a pixel point on the initial edge is obtained as an initial edge point.

Specifically, any pixel point on the initial edge may be selected as the initial edge point. The selected pixel point may be a feature point or a point other than the feature point.

In step S1422, an extension point corresponding to the initial edge point is determined according to reference points on two sides of the initial edge point, where the extension point is located outside the second image region.

Figure 1D:
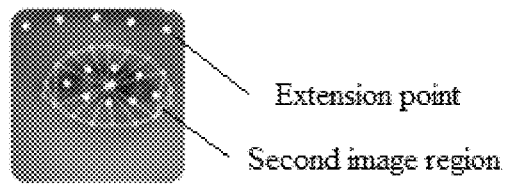

The reference points may be pixel points or feature points on two sides of the initial edge point. One initial edge point may correspond to one or more extension points. As shown in FIG. 1d, the white points outside the enclosed region are the extension points.

In step S1423, the extension point is connected to form the target edge.

In a sixth optional embodiment, step S1422 includes following steps A and B.

In step A, a type of the initial edge point is determined according to the reference points on two sides of the initial edge point.

Figure 1E:
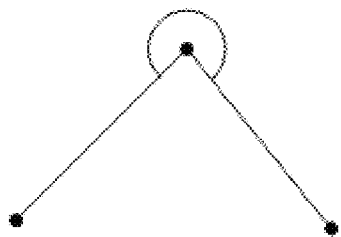
Figure 1F:

Specifically, the initial edge point and the reference points on two sides of the initial edge point are connected to obtain two line segments, as shown in FIGS. 1e and 1f, the two line segments form an included angle, and the type of the initial edge point is determined according to the included angle. For example, if the included angle is an obtuse angle, the type of the initial edge point is determined to be a convex point, and if the included angle is an acute angle, the type of the initial edge point is determined to be a concave point.

In step B, the extension point corresponding to the initial edge point is determined according to the type.

For different types of initial edge points, the corresponding extension points are determined by using different methods, which is described in detail in the seventh optional embodiment below.

In a seventh optional embodiment, step B includes:

in a case that the type is a convex point, normals of segments formed by connecting the initial edge point and the reference points are extended outwardly by a predetermined length to obtain outer end points of the normals, and interpolation and smoothing is performed between the outer end points according to an included angle of the normals, to determine the extension point; in a case that the type is a concave point, a bisector of an angle formed by the initial edge point and the reference points is extended outwardly by a predetermined length to obtain an outer end point of the bisector, and the outer end point of the angle bisector is determined as the extension point corresponding to the initial edge point.

The predetermined length may be customized.

Figure 1G:
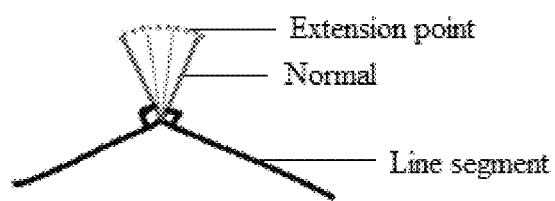
Figure 1H:
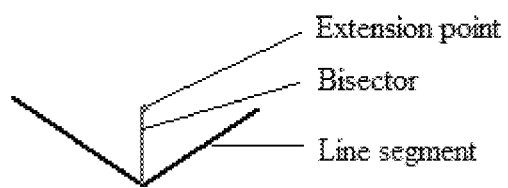
Figure 1I:
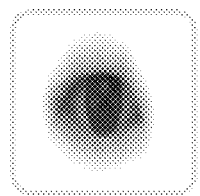

For example, as shown in FIG. 1g, in a case that the type is the convex point, two outer end points may be determined according to the normal directions of the two line segments. When the two outer end points are distant from each other, the resulting image region is not smooth enough. In this embodiment, multiple extension points are obtained by performing interpolation and smoothing between the two outer end points, and are used as the extension points corresponding to the initial edge point. As shown in FIG. 1h, in a case that the type is a concave point, the outer end point is determined according to the bisector of the angle between the two line segments. In this case, there is only one outer end point, and the outer end point is directly used as the extension point corresponding to the initial edge point.

In an eighth optional embodiment, step S143 includes following steps S1431 to S1433.

In step S1431, a product of a preset first weight and a pixel value of a pixel point on the initial edge in the image is determined as a pixel value of the pixel point on the initial edge in the cutout image.

The preset first weight may be customized by the user. For example, the preset first weight may be set to 1.

In step S1432, a product of a preset second weight and a pixel value of a pixel point on the target edge in the image is determined as a pixel value of the pixel point on the target edge in the cutout image.

The preset second weight may be customized by the user. For example, the preset second weight may be set to 0. When setting the preset first weight and the preset second weight, in order to make the image region formed by the initial edge and the target edge achieve the effect that the transparency gradually decreases with the degree of expansion, the preset first weight is greater than the preset second weight.

In step S1433, a pixel value of each pixel in a fifth image region is determined according to the initial edge and the target edge, where the fifth image region is between the initial edge and the target edge.

In a ninth optional embodiment, step S1433 includes following steps C to E.

In step C, one or more first pixel points on the initial edge and one or more second pixel points on the target edge are selected to form a polygon.

The first pixel point may be any pixel point, any feature point or any initial edge point on the initial edge. The second pixel point may be any pixel point, any feature point or any extension point on the target edge.

Moreover, the one or more first pixel points and the one or more second pixel points may form a polygon, which may be a triangle, a quadrangle, a pentagon, or the like.

In step D, a third weight of a third pixel located in the polygon is determined according to coordinates of the vertices of the polygon and coordinates of the third pixel.

For the method for determining the third weight of the third pixel in this step, reference may be made to the description of the following tenth optional embodiment.

In addition to determining the third weight of the third pixel in this step, in order to achieve a gradual decrease in transparency with the degree of expansion, the weight of the pixel point in the polygon may alternatively be set to a value between the preset first weight and the preset second weight, such as a value between 0 and 1.

In step E, a product of the third weight and a pixel value of the third pixel in the image is determined as a pixel value of the third pixel in the cutout image.

In a tenth optional embodiment, step D includes following steps D1 and D2.

In step D1, weight coefficients of the vertices are respectively determined according to the coordinates of the vertices of the polygon and the coordinates of the third pixel point.

In step D2, a weighted sum of the weight coefficients of the vertices and preset weighting parameters is determined as the third weight.

The preset weight parameter may be determined according to an edge on which the vertex is located. Specifically, if the vertex is the first pixel point on the initial edge, the weight parameter is the preset first weight, and if the vertex is the extension point on the target edge, the weight parameter is the preset second weight.

This embodiment will be described by taking the polygon being a triangle as an example. Three vertices of the triangle include the first pixel point on the initial edge and the extension point on the target edge. For example, the three vertices include two first pixel points on the initial edge and one extension point on the target edge, or include one first pixel point on the initial edge and two extension points on the target edge. Therefore, given that the coordinates of the three vertices P1, P2 and P3 of the triangle are known; u and v are respectively used as the weight coefficients of P2 and P3, and (1−u−v) is used as the weight coefficient of P1; for any point P in the triangle, (u, v) satisfy the conditions u≥0, v≥0, and u+v≤1. In a case that the coordinates of P1, P2, P3 and P are known, the values of u and v may be obtained by solving the following equations:

$$P \cdot x = (1-u-v) \times P1 \cdot x + u \times P2 \cdot x + v \times P3 \cdot x; \text{ and}$$

$$P \cdot y = (1-u-v) \times P1 \cdot y + u \times P2 \cdot y + v \times P3 \cdot y.$$

In the above equations, P·x is an abscissa of P, P·y is an ordinate of P, P1·x is an abscissa of P1, P1·y is an ordinate of P, P2·x is an abscissa of P2, P2·y is an ordinate of P2, P3·x is an abscissa of P3, and P3·y is an ordinate of P3. With the above u and v, the weight coefficients of P1, P2, and P3 may be obtained. The weight parameters W1, W2, and W3 corresponding to P1, P2, and P3 are known, so the weighted sum of the weight coefficients and the weight parameters corresponding to P1, P2, P3 may be used as the weight of the pixel point P. That is, the weight of P may be calculated with the equation W=(1−u−v)×W1+u×W2+W×P3.

Those skilled in the art should understand that, obvious modifications (for example, a combination of the listed modes) or equivalent substitutions can be made on the basis of the foregoing various embodiments.

Although various steps in the embodiments of the image matting method are described in the above order hereinbefore, those skilled in the art should understand that steps in the embodiments of the present disclosure are not necessary to be performed in the described order and also be performed in a reverse order, a parallel order, a crossover order or other orders. In addition, based on the above steps, those skilled in the art may also add other steps to the above steps. These distinct variations or equivalent substitutions also fall within the protection scope of the present disclosure, which is not described herein.

Device embodiments of the present disclosure are described below. The device embodiments of the present disclosure may be applied to implement steps in the method embodiments of the present disclosure. Only parts relevant to the device embodiments are described for illustration. For specific technical details not disclosed, one may refer to the method embodiments of the present disclosure.

Second Embodiment

Figure 2:
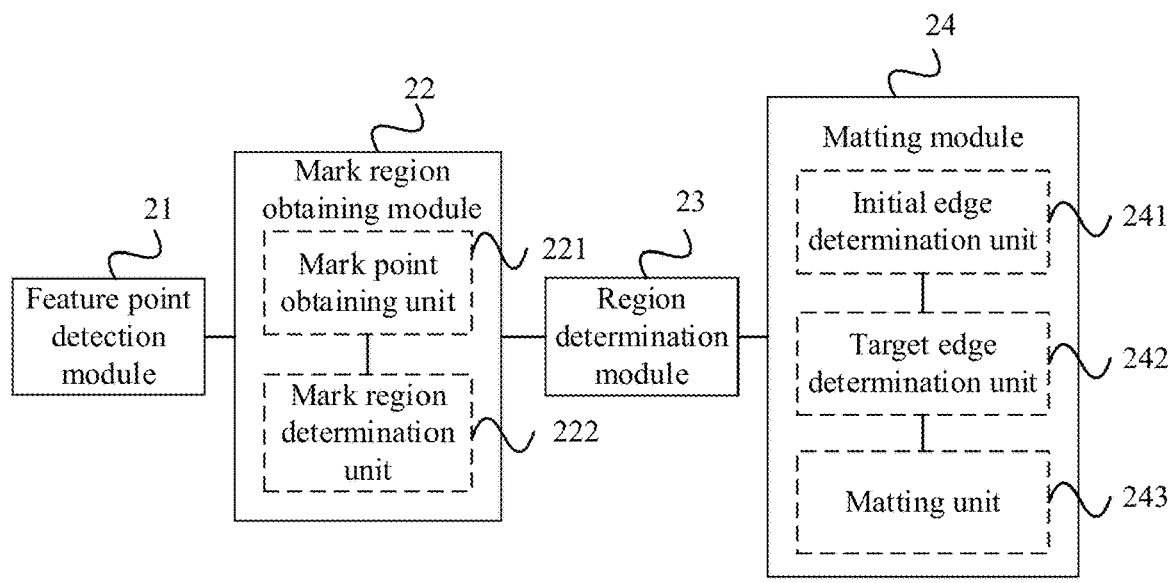
FIG. 2 is a schematic structural diagram of a matting apparatus according to an embodiment of the present disclosure.

In order to solve the technical problem in the conventional technology that it is difficult to accurately cut out a required region from an image by using a matting template, an image matting apparatus is provided according to the embodiments of the present disclosure. The apparatus may perform steps in the matting method according to the first embodiment. As shown in FIG. 2, the apparatus includes a feature point detection module 21, a mark region obtaining module 22, a region determination module 23, and a matting module 24.

The feature point detection module 21 is configured to perform feature point detection on an image, to obtain multiple feature points.

The mark region obtaining module 22 is configured to obtain a first image region that is manually marked on the image.

The region determination module 23 is configured to adjust the first image region according to the feature points, to obtain a second image region.

The matting module 24 is configured to perform matting on the image according to the second image region.

Further, the mark region obtaining module 22 includes a mark point obtaining unit 221 and a mark region determination unit 222.

The mark point obtaining unit 221 is configured to obtain a mark point that is manually marked on the image.

The mark region determination unit 222 is configured to determine the mark point as an edge point of the first image region.

Further, the mark region determination unit 222 is configured to adjust a position of the mark point according to the feature points to determine a first target point corresponding to the mark point, and determine a closed region enclosed by the first target point as the second image region.

Further, the mark region determination unit 222 is configured to select, from the feature points, an initial point that is closest to the mark point; determine a closed region enclosed by the initial point as a third image region; and determine a center of the third image region as the first target point corresponding to the mark point.

Further, the matting module 24 includes an initial edge determination unit 241, a target edge determination unit 242, and a matting unit 243.

The initial edge determination unit 241 is configured to determine an edge of the second image region as an initial edge.

The target edge determination unit 242 is configured to expend the second image region from the initial edge outwardly, to obtain a target edge.

The matting unit 243 is configured to cut out a fourth image region enclosed by the target edge, to obtain a cutout image.

Further, the target edge determination unit 242 is configured to obtain a pixel point on the initial edge as an initial edge point; determine, according to reference points on two sides of the initial edge point, an extension point corresponding to the initial edge point, where the extension point is located outside the second image region, and connect the extension point, to form the target edge.

Further, the target edge determination unit 242 is configured to determine a type of the initial edge point according to the reference points on two sides of the initial edge point; and determine the extension point corresponding to the initial edge point according to the type.

Further, the target edge determination unit 242 is configured to, in a case that the type is a convex point, outwardly extend normals of segments formed by connecting the initial edge point and the reference points by a predetermined length to obtain outer end points of the normals, and perform interpolation and smoothing between the outer end points according to an included angle of the normals, to determine the extension point; and in a case that the type is a concave point, outwardly extend a bisector of an angle formed by the initial edge point and the reference points by a predetermined length to obtain an outer end point of the bisector, and determine the outer end point of the angle bisector as the extension point corresponding to the initial edge point.

Further, the matting unit 243 is configured to determine a product of a predetermined first weight and a pixel value of a pixel point on the initial edge in the image as a pixel value of the pixel point on the initial edge in the cutout image; determine a product of a predetermined second weight and a pixel value of a pixel point on the target edge in the image as a pixel value of the pixel point on the target edge in the cutout image; and determine, based on the initial edge and the target edge, a pixel value of each pixel point in a fifth image region, where the fifth image region is between the initial edge and the target edge.

Further, the matting unit 243 is configured to select one or more first pixel points on the initial edge and one or more second pixels on the target edge to form a polygon; determine, according to coordinates of vertices of the polygon and coordinates of a third pixel point located in the polygon, a third weight of the third pixel point; and determine a product of the third weight and a pixel value of the third pixel point in the image as a pixel value of the third pixel point in the cutout image.

Further, the matting unit 243 is configured to respectively determine, according to the coordinates of the vertices of the polygon and the coordinates of the third pixel point, weight coefficients of the vertices; and obtain a weighted sum of the weight coefficients of the vertices and preset weighting parameters as the third weight.

Regarding the operation principle and the achieved technical effect of the matting apparatus according to the above embodiments, which are not described in detail herein, reference may be made to the related description in the embodiments of the matting method.

Third Embodiment

Figure 3:
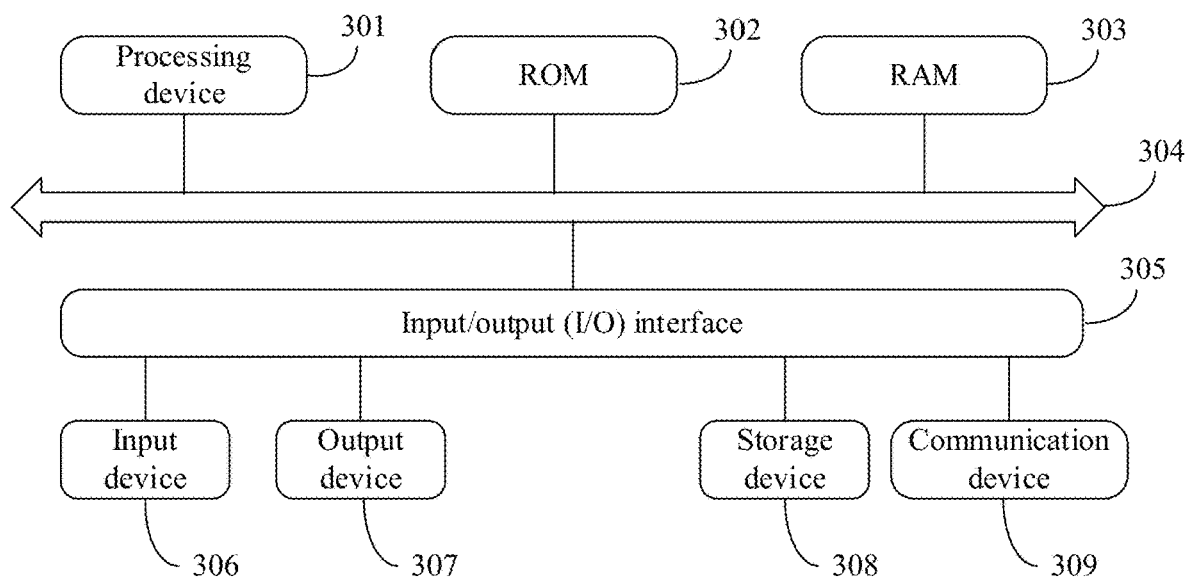
FIG. 3 is a schematic structural diagram of an electronic apparatus according to an embodiment of the present disclosure.

Reference is made to FIG. 3, which shows a schematic structural diagram of an electronic apparatus 300 according to an embodiment of the present disclosure. The terminal device in the present disclosure may include but is not limited to a mobile terminal such as a mobile phone, a notebook computer, a digital broadcast receiver, a PDA (Personal Digital Assistant), a PAD (tablet computer), a PMP (Portable Multimedia Player), an in-vehicle terminal (such as an in-vehicle navigation terminal), and the like, and a fixed terminal such as a digital TV, a desktop computer and the like. The electronic apparatuses shown in FIG. 3 is only an example, and should not limit the function and scope of use of the embodiments of the present disclosure.

As shown in FIG. 3, the electronic apparatus 300 includes a processing device (such as a central processing unit, a graphics processing unit) 301. The processing device 301 can perform various appropriate actions and processes based on a program stored in a Read-Only Memory (ROM) 302 or a program loaded in a Random-Access Memory (RAM) 303 from a storage device 306. The RAM 303 also stores various programs and data required by the electronic apparatus 300 for operation. The processing device 301, the ROM 302, and the RAM 303 are connected to each other via a bus 304. An input/output (I/O) interface 305 is also connected to the bus 304.

Generally, the following may be connected to the I/O interface 305: an input device 306 such as a touch screen, a touch pad, a keyboard, a mouse, a camera, a microphone, an accelerometer, a gyroscope, an output device 307 such as a Liquid Crystal Display (LCD), a speaker, a vibrator, a storage device 306 such as a magnetic tape, a hard disk, and a communication device 309. Based on the communication device 309, the electronic apparatus 300 may communicate with other apparatuses through wired or wireless communication to exchange data. Although FIG. 3 shows the electronic apparatus 300 including various devices, it should be understood that not all shown devices are required to be implemented or included. The shown devices may be replaced by other devices, or more or less devices may be included.

In particular, the processes, described above with reference to flow charts, may be implemented as a computer software program according to an embodiment of the present disclosure. For example, a computer program product is provided according to an embodiment of the present disclosure, the computer program product includes a computer program embodied on a non-transitory computer readable medium. The computer program includes program codes for performing the method shown in the flowchart. In such embodiments, the computer program may be downloaded and installed from the network through the communication device 309, installed from the storage device 306, or installed from the ROM 302. The computer program, when being executed by the processing device 301, performs functions defined in the method according to the embodiments of the present disclosure.

It should be noted that the computer readable medium provided according to the present disclosure, may be a computer readable signal medium or a computer readable storage medium or any combination of the two. The computer readable storage medium can be, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a Random-Access Memory (RAM), a Read-Only Memory (ROM), an Erasable Programmable Read-Only Memory (EPROM or Flash memory), an optical fiber, a portable Compact Disk Read-Only Memory (CD-ROM), an optical storage device, a magnetic storage device, or any suitable combination of the foregoing. In the present disclosure, the computer readable storage medium can be any tangible medium containing or storing a program, where the program can be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium can send, transmit or transfer programs used by an instruction execution system, an instruction execution apparatus and an instruction execution device or used in combination with the instruction execution system, the instruction execution apparatus and the instruction execution device. The program codes included in the computer readable medium may be transferred through any proper medium including, but not limited to, an electric wire, an optical cable, RF (Radio Frequency), and the like, and any proper combination of the above.

In some embodiments, the client and the server can communicate by using any currently known or future developed network protocol such as HTTP (HyperText Transfer Protocol), and can be interconnected with digital data communication in any form or medium (for example, a communication network). Examples of the communication network include Local Area Network ("LAN"), Wide Area Network ("WAN"), an internet (for example, the Internet), and an end-to-end network (for example, the ad hoc end-to-end network), as well as any currently known or future developed network.

The computer readable medium may be included in the electronic apparatus. Alternatively, the computer readable medium may exist independently and not assembled in the electronic apparatus.

The computer readable medium may carry one or more programs. The electronic apparatus, when executing the one or more programs, cause the electronic apparatus to perform feature point detection on an image, to obtain feature points; obtain a first image region that is manually marked on the image; adjust the first image region according to the feature points, to obtain a second image region; and perform matting on the image according to the second image region.

The computer program codes for performing the operations according to the present disclosure may be written in at least one programming language or a combination of the at least one programming language. The programming language includes an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some substitution implementations, a function indicated in the block may also occur in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a special hardware-based system for performing a specified function or operation or implemented by a combination of a special hardware and a computer instruction.

Units involved in the embodiments of the present disclosure may be implemented by software or by hardware. The names of the units do not in any way constitute a limitation on the unit itself, for example, the first obtaining unit may also be named "a unit for obtaining at least two Internet Protocol addresses".

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Parts (ASSP), System on Chip (SOC), Complex Programmable Logical device (CPLD), and the like.

In the context of the present disclosure, a machine-readable medium may be a tangible medium, which may contain or store a program for use by an instruction execution system, apparatus, or device or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, a portable computer disk, a hard disk, Random Access Memory (RAM), Read-Only Memory (ROM), Erasable Programmable Read-Only Memory (EPROM or flash memory), an optical fiber, a Portable Compact Disk Read-Only Memory (CD-ROM), an optical storage device, a magnetic storage device, or any suitable combination of the foregoing.

According to one or more embodiments of the present disclosure, a matting method is provided, which includes:
　performing feature point detection on an image, to obtain feature points;
　obtaining a first image region that is manually marked on the image;
　adjusting the first image region according to the feature points, to obtain a second image region; and
　performing matting on the image according to the second image region.

Further, the obtaining a first image region that is manually marked on the image includes:
　obtaining a mark point that is manually marked on the image;
　determining the mark point as an edge point of the first image region.

Further, the adjusting the first image region according to the feature points, to obtain a second image region includes:
　adjusting a position of the mark point according to the feature points, to determine a first target point corresponding to the mark point, and
　determining a closed region enclosed by the first target point as the second image region.

Further, the adjusting a position of the mark point according to the feature points, to determine a first target point corresponding to the mark point includes:
　selecting, from the feature points, an initial point that is closest to the mark point;
　determining a closed region enclosed by the initial point as a third image region; and
　determining a center of the third image region as the first target point corresponding to the mark point.

Further, the performing matting on the image according to the second image region includes:
　determining an edge of the second image region as an initial edge;
　expending the second image region from the initial edge outwardly, to obtain a target edge; and
　cutting out a fourth image region enclosed by the target edge, to obtain a cutout image.

Further, the expending the second image region from the initial edge outwardly, to obtain the target edge includes:
　obtaining a pixel point on the initial edge as an initial edge point;

determining, according to reference points on two sides of the initial edge point, an extension point corresponding to the initial edge point, where the extension point is located outside the second image region, and connecting the extension point, to form the target edge.

Further, the determining, according to reference points on two sides of the initial edge point, an extension point corresponding to the initial edge point includes:

determining a type of the initial edge point according to the reference points on two sides of the initial edge point; and determining the extension point corresponding to the initial edge point according to the type.

Further, the determining the extension point corresponding to the initial edge point according to the type includes:

in a case that the type is a convex point, outwardly extending normals of segments formed by connecting the initial edge point and the reference points by a predetermined length to obtain outer end points of the normals, and perform interpolation and smoothing between the outer end points according to an included angle of the normals, to determine the extension point; and in a case that the type is a concave point, outwardly extending a bisector of an angle formed by the initial edge point and the reference points by a predetermined length to obtain an outer end point of the bisector, and determining the outer end point of the angle bisector as the extension point corresponding to the initial edge point.

Further, the cutting out a fourth image region enclosed by the target edge, to obtain a cutout image includes:

determining a product of a predetermined first weight and a pixel value of a pixel point on the initial edge in the image as a pixel value of the pixel point on the initial edge in the cutout image;

determining a product of a predetermined second weight and a pixel value of a pixel point on the target edge in the image as a pixel value of the pixel point on the target edge in the cutout image; and determining, based on the initial edge and the target edge, a pixel value of each pixel point in a fifth image region, where the fifth image region is between the initial edge and the target edge.

Further, the determining, based on the initial edge and the target edge, a pixel value of each pixel point in a fifth image region includes:

selecting one or more first pixel points on the initial edge and one or more second pixels on the target edge to form a polygon;

determining, according to coordinates of vertices of the polygon and coordinates of a third pixel point located in the polygon, a third weight of the third pixel point; and determining a product of the third weight and a pixel value of the third pixel point in the image as a pixel value of the third pixel point in the cutout image.

Further, the determining, according to coordinates of vertices of the polygon and coordinates of a third pixel point located in the polygon, a third weight of the third pixel point includes:

respectively determining, according to the coordinates of the vertices of the polygon and the coordinates of the third pixel point, weight coefficients of the vertices; and obtaining a weighted sum of the weight coefficients of the vertices and preset weighting parameters as the third weight.

According to one or more embodiments of the present disclosure, a matting apparatus is provided, which includes a feature point detection module, a mark region obtaining module, a region determination module, and a matting module.

The feature point detection module is configured to perform feature point detection on an image, to obtain multiple feature points.

The mark region obtaining module is configured to obtain a first image region that is manually marked on the image.

The region determination module is configured to adjust the first image region according to the feature points, to obtain a second image region.

The matting module is configured to perform matting on the image according to the second image region.

Further, the mark region obtaining module includes a mark point obtaining unit and a mark region determination unit.

The mark point obtaining unit is configured to obtain a mark point that is manually marked on the image.

The mark region determination unit is configured to determine the mark point as an edge point of the first image region.

Further, the mark region determination unit is configured to adjust a position of the mark point according to the feature points to determine a first target point corresponding to the mark point, and determine a closed region enclosed by the first target point as the second image region.

Further, the mark region determination unit is configured to select, from the feature points, an initial point that is closest to the mark point; determine a closed region enclosed by the initial point as a third image region; and determine a center of the third image region as the first target point corresponding to the mark point.

Further, the matting module includes an initial edge determination unit, a target edge determination unit, and a matting unit.

The initial edge determination unit is configured to determine an edge of the second image region as an initial edge.

The target edge determination unit is configured to expend the second image region from the initial edge outwardly, to obtain a target edge.

The matting unit is configured to cut out a fourth image region enclosed by the target edge, to obtain a cutout image.

Further, the target edge determination unit is configured to obtain a pixel point on the initial edge as an initial edge point; determine, according to reference points on two sides of the initial edge point, an extension point corresponding to the initial edge point, where the extension point is located outside the second image region, and connect the extension point, to form the target edge.

Further, the target edge determination unit is configured to determine a type of the initial edge point according to the reference points on two sides of the initial edge point; and determine the extension point corresponding to the initial edge point according to the type.

Further, the target edge determination unit is configured to, in a case that the type is a convex point, outwardly extend normals of segments formed by connecting the initial edge point and the reference points by a predetermined length to obtain outer end points of the normals, and perform interpolation and smoothing between the outer end points according to an included angle of the normals, to determine the extension point; and in a case that the type is a concave point, outwardly extend a bisector of an angle formed by the initial edge point and the reference points by a predetermined length to obtain an outer end point of the bisector, and determine the outer end point of the angle bisector as the extension point corresponding to the initial edge point.

Further, the matting unit is configured to determine a product of a predetermined first weight and a pixel value of a pixel point on the initial edge in the image as a pixel value of the pixel point on the initial edge in the cutout image; determine a product of a predetermined second weight and a pixel value of a pixel point on the target edge in the image as a pixel value of the pixel point on the target edge in the cutout image; and determine, based on the initial edge and the target edge, a pixel value of each pixel point in a fifth image region, where the fifth image region is between the initial edge and the target edge.

Further, the matting unit is configured to select one or more first pixel points on the initial edge and one or more second pixels on the target edge to form a polygon; determine, according to coordinates of vertices of the polygon and coordinates of a third pixel point located in the polygon, a third weight of the third pixel point; and determine a product of the third weight and a pixel value of the third pixel point in the image as a pixel value of the third pixel point in the cutout image.

Further, the matting unit is configured to respectively determine, according to the coordinates of the vertices of the polygon and the coordinates of the third pixel point, weight coefficients of the vertices; and obtain a weighted sum of the weight coefficients of the vertices and preset weighting parameters as the third weight.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

The invention claimed is:

1. A method of implementing image matting on an image, comprising:
performing feature point detection on the image to obtain feature points;
obtaining a first image region that is manually marked on the image;
adjusting the first image region according to the feature points to obtain a second image region; and
performing matting on the image according to the second image region, wherein the performing matting on the image according to the second image region comprises:
detecting an edge of the second image region as an initial edge,
expanding the second image region from the initial edge outwardly to obtain a target edge, and
generating a cutout image by cutting out a region of the image enclosed by the target edge.

2. The method according to claim 1, wherein the obtaining a first image region that is manually marked on the image comprises:
obtaining a mark point that is manually marked on the image; and
determining the mark point as an edge point of the first image region.

3. The method according to claim 2, wherein the adjusting the first image region according to the feature points to obtain a second image region comprises:
adjusting a position of the mark point according to the feature points, to determine a first target point corresponding to the mark point, and
determining a closed region enclosed by the first target point as the second image region.

4. The method according to claim 3, wherein the adjusting a position of the mark point according to the feature points, to determine a first target point corresponding to the mark point comprises:
selecting, from the feature points, an initial point that is closest to the mark point;
determining a closed region enclosed by the initial point as a third image region; and
determining a center of the third image region as the first target point corresponding to the mark point.

5. The method according to claim 1, wherein the expanding the second image region from the initial edge outwardly to obtain the target edge comprises:
obtaining a pixel point on the initial edge as an initial edge point;
determining, according to reference points on two sides of the initial edge point, an extension point corresponding to the initial edge point, wherein the extension point is located outside the second image region, and
connecting the extension point, to form the target edge.

6. The method according to claim 5, wherein the determining, according to reference points on two sides of the initial edge point, an extension point corresponding to the initial edge point comprises:
determining a type of the initial edge point according to the reference points on two sides of the initial edge point; and
determining the extension point corresponding to the initial edge point according to the type.

7. The method according to claim 6, wherein the determining the extension point corresponding to the initial edge point according to the type comprises:
in a case that the type is a convex point, outwardly extending normals of segments formed by connecting the initial edge point and the reference points by a predetermined length to obtain outer end points of the normals, and perform interpolation and smoothing between the outer end points according to an included angle of the normals, to determine the extension point; and in a case that the type is a concave point, outwardly extending a bisector of an angle formed by the initial edge point and the reference points by a predetermined length to obtain an outer end point of the bisector, and determining the outer end point of the angle bisector as the extension point corresponding to the initial edge point.

8. The method according to claim 1, wherein the generating a cutout image by cutting out a region of the image enclosed by the target edge comprises:

determining a product of a predetermined first weight and a pixel value of a pixel point on the initial edge in the image as a pixel value of the pixel point on the initial edge in the cutout image;

determining a product of a predetermined second weight and a pixel value of a pixel point on the target edge in the image as a pixel value of the pixel point on the target edge in the cutout image; and determining, based on the initial edge and the target edge, a pixel value of each pixel point in a fifth image region, wherein the fifth image region is between the initial edge and the target edge.

9. The method according to claim 8, wherein the determining, based on the initial edge and the target edge, a pixel value of each pixel point in a fifth image region comprises:

selecting one or more first pixel points on the initial edge and one or more second pixels on the target edge to form a polygon;

determining, according to coordinates of vertices of the polygon and coordinates of a third pixel point located in the polygon, a third weight of the third pixel point; and determining a product of the third weight and a pixel value of the third pixel point in the image as a pixel value of the third pixel point in the cutout image.

10. The method according to claim 9, wherein the determining, according to coordinates of vertices of the polygon and coordinates of a third pixel point located in the polygon, a third weight of the third pixel point comprises:

respectively determining, according to the coordinates of the vertices of the polygon and the coordinates of the third pixel point, weight coefficients of the vertices; and obtaining a weighted sum of the weight coefficients of the vertices and preset weighting parameters as the third weight.

11. A computing device of implementing image matting on an image, comprising:

at least one processor; and at least one memory communicatively coupled to the at least one processor and storing instructions that upon execution by the at least one processor cause the at least one processor to perform operations comprising:

performing feature point detection on the image to obtain feature points;

obtaining a first image region that is manually marked on the image;

adjusting the first image region according to the feature points to obtain a second image region; and performing matting on the image according to the second image region, wherein the performing matting on the image according to the second image region comprises:

detecting an edge of the second image region as an initial edge, expanding the second image region from the initial edge outwardly to obtain a target edge, and generating a cutout image by cutting out a region of the image enclosed by the target edge.

12. The apparatus according to claim 11, wherein the obtaining a first image region that is manually marked on the image comprises:

obtaining a mark point that is manually marked on the image; and determining the mark point as an edge point of the first image region.

13. The apparatus according to claim 12, wherein the adjusting the first image region according to the feature points to obtain a second image region comprises:

adjusting a position of the mark point according to the feature points, to determine a first target point corresponding to the mark point, and determining a closed region enclosed by the first target point as the second image region.

14. The apparatus according to claim 13, wherein the adjusting a position of the mark point according to the feature points, to determine a first target point corresponding to the mark point comprises:

selecting, from the feature points, an initial point that is closest to the mark point;

determining a closed region enclosed by the initial point as a third image region; and determining a center of the third image region as the first target point corresponding to the mark point.

15. The apparatus according to claim 11, wherein the expanding the second image region from the initial edge outwardly to obtain the target edge comprises:

obtaining a pixel point on the initial edge as an initial edge point;

determining, according to reference points on two sides of the initial edge point, an extension point corresponding to the initial edge point, wherein the extension point is located outside the second image region, and connecting the extension point, to form the target edge.

16. The apparatus according to claim 15, wherein the determining, according to reference points on two sides of the initial edge point, an extension point corresponding to the initial edge point comprises:

determining a type of the initial edge point according to the reference points on two sides of the initial edge point; and determining the extension point corresponding to the initial edge point according to the type.

17. The apparatus according to claim 16, wherein the determining the extension point corresponding to the initial edge point according to the type comprises:

in a case that the type is a convex point, outwardly extending normals of segments formed by connecting the initial edge point and the reference points by a predetermined length to obtain outer end points of the normals, and perform interpolation and smoothing between the outer end points according to an included angle of the normals, to determine the extension point; and in a case that the type is a concave point, outwardly extending a bisector of an angle formed by the initial edge point and the reference points by a predetermined length to obtain an outer end point of the bisector, and determining the outer end point of the angle bisector as the extension point corresponding to the initial edge point.

18. A non-transitory computer readable storage medium configured to store non-transient computer readable instructions, wherein the non-transient computer readable instructions, when executed by a computer, cause the computer to perform operations of implementing image matting on an image, the operations comprising:
performing feature point detection on the image to obtain feature points;
obtaining a first image region that is manually marked on the image;
adjusting the first image region according to the feature points to obtain a second image region; and
performing matting on the image according to the second image region, wherein the performing matting on the image according to the second image region comprises:
detecting an edge of the second image region as an initial edge,
expanding the second image region from the initial edge outwardly to obtain a target edge, and
generating a cutout image by cutting out a region of the image enclosed by the target edge.

19. The non-transitory computer readable storage medium according to claim 18, wherein the expanding the second image region from the initial edge outwardly to obtain the target edge comprises:

obtaining a pixel point on the initial edge as an initial edge point;
determining, according to reference points on two sides of the initial edge point, an extension point corresponding to the initial edge point, wherein the extension point is located outside the second image region, and
connecting the extension point to form the target edge.

20. The non-transitory computer readable storage medium according to claim 18, the generating a cutout image by cutting out a region of the image enclosed by the target edge comprises:

determining a product of a predetermined first weight and a pixel value of a pixel point on the initial edge in the image as a pixel value of the pixel point on the initial edge in the cutout image;
determining a product of a predetermined second weight and a pixel value of a pixel point on the target edge in the image as a pixel value of the pixel point on the target edge in the cutout image; and
determining, based on the initial edge and the target edge, a pixel value of each pixel point in a fifth image region, wherein the fifth image region is between the initial edge and the target edge.

* * * * *